United States Patent Office 3,245,825
Patented Apr. 12, 1966

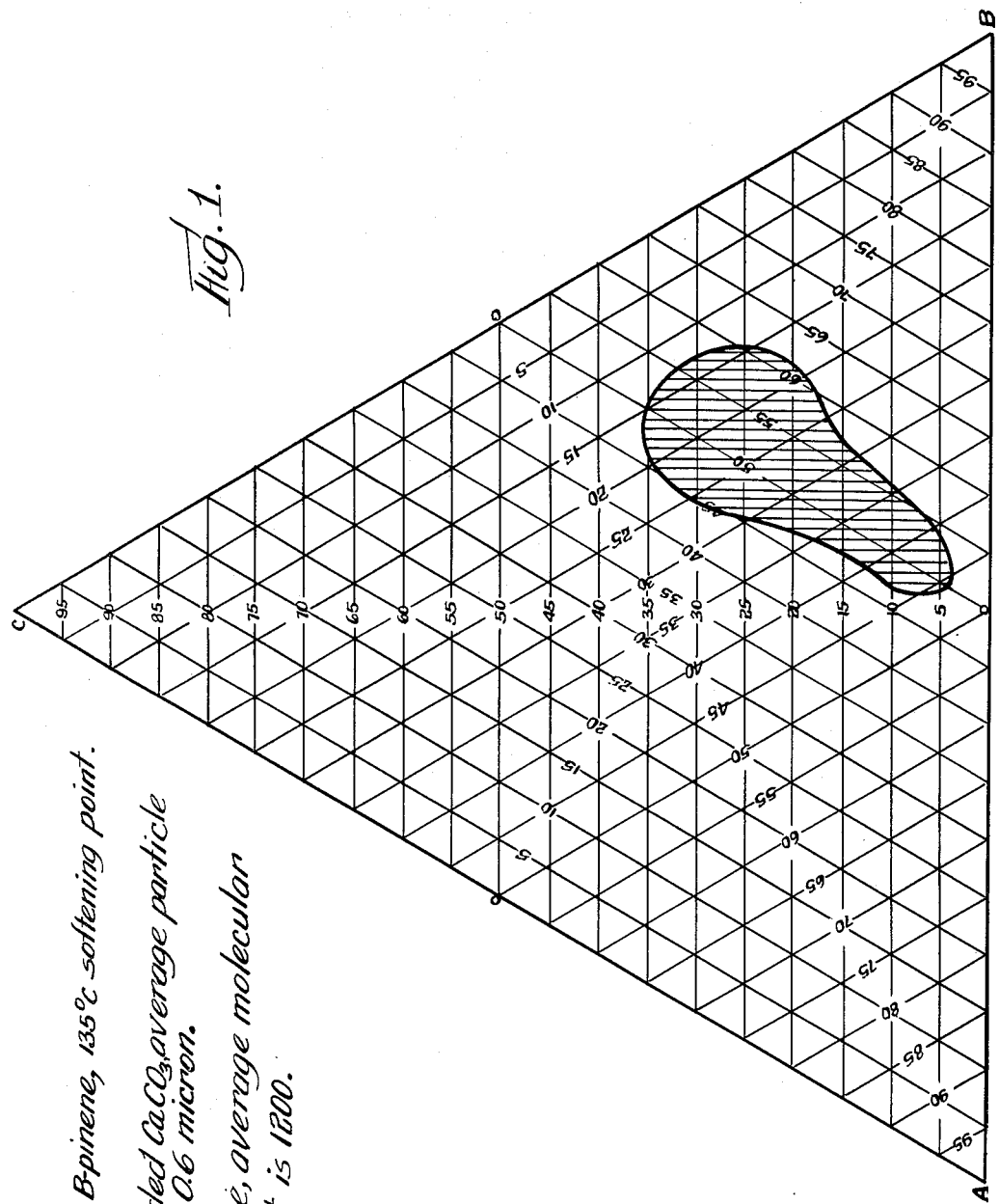

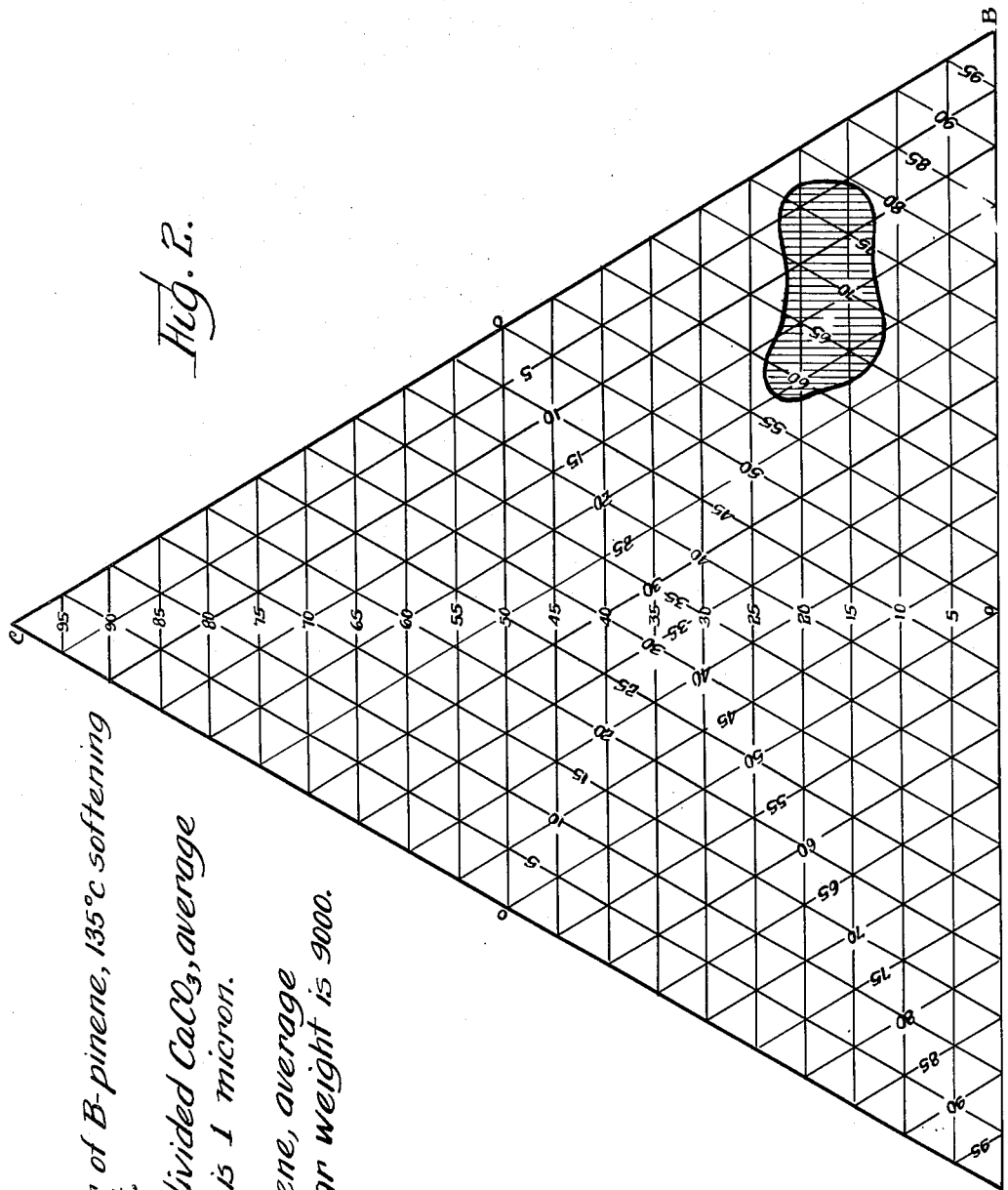

3,245,825
PRINTING ON OLEFIN POLYMERS AND INK COMPOSITIONS THEREFOR
William Alfred Fessler, Glen Ellyn, and Bernard C. Gregory and Orval L. Gerloff, Chicago, Ill., assignors to Daubert Chemical Company, Chicago, Ill., a corporation of Illinois
Filed Mar. 14, 1958, Ser. No. 721,411
5 Claims. (Cl. 117—38)

Our invention is directed to printing on solid olefin polymers, notably polyethylene and polypropylenes, and is particularly concerned with the utilization of certain inks for printing thereon to produce new and markedly useful results not heretofore achievable.

The invention will be described in particular relation to polyethylene because that is in widespread commercial use at the present time. While polyethylene has gone into widespread use for a variety of purposes, including the packaging of numerous articles, one of the major difficulties encountered in its use is the fact that it is exceedingly difficult to effect satisfactory printing on its surface. The usual printing inks will not adhere adequately thereto and numerous efforts have been made, so far as we are aware with little if any avail, to develop inks which would overcome the aforementioned deficiency.

To attempt to meet the problem, it has been found to be necessary to modify the surface characteristics and properties of the polyethylene so that known types of printing inks will adequately adhere thereto. This has been done by a variety of techniques such as by subjecting the polyethylene surface to high heat, for instance by the direct impingement of a flame thereon for a short period of time, by ozone treatment, and by other types of procedure. These surface modification treatment techniques are, generally speaking, undesirable for a number of reasons. In the first place, they are relatively cumbersome to carry out. In the next place, their employment necessarily involves added expense. Finally, such treatments, in general, tend objectionably to modify various properties and characteristics of the polyethylene such as increase in moisture-vapor penetration rate; loss of heat-seal strength characteristics after passage of a few months; acceleration of air oxidation of the polyethylene, particularly in the form of thin film stock, with attendant loss in tensile strength; and the development, with passage of time, of objectionable odors.

We have discovered compositions which are highly useful as ink bases and inks which can be used for printing on ordinary polyethylene (prepared by low pressure as well as high pressure techniques), that is, polyethylene which has not undergone special surface treatment to adapt it to take ordinary printing inks, and which give exceptionally satisfactory results when so employed. Ink compositions made in accordance with our invention are very strongly adherent to untreated polyethylene, they form non-tacky printed surfaces, and they produce printed surfaces which are so highly flexible that the printing does not flake off even when the polyethylene is vigorously flexed, in many cases even where the flexing is carried out at temperatures of the order of 0 degree F. Many of the ink base compositions of our invention, furthermore, have the advantage of being soluble in inexpensive organic solvents to produce finished inks which do not attack equipment, such as rubber rolls, customarily used in printing operations. Ink bases made in accordance with our invention can be provided in any desired color through additions of selected known types of dyes and/or pigments. Moreover, components can be chosen, in the formulation of our ink compositions, which not only provide the very important advantages described above in regard to printing on untreated polyethylene, but which are very resistant to deterioration by air or sunlight and which possess an unusually high degree of permanency. The ink compositions of our invention, incidentally, also print exceptionally well on pretreated polyethylene but, of course, their most significant utility lies in printing on untreated polyethylene.

The ink base compositions of our invention contain, as essential ingredients, (a) certain butene and/or isobutene polymers (polybutenes and/or polyisobutenes), (b) resins compatible therewith, and (c) finely divided inert solids, advantageously in the proportions described below.

The polybutenes and/or polyisobutenes, which are of tacky character, should have a molecular weight of at least 800, better still at least about 900, and especially advantageously from about 1200 to about 9,000. The molecular weight may go up to and, indeed, beyond 80,000, but such products are of extremely high viscosity and, when embodied in inks, said inks have a consistency such as to make the inks difficult to handle on the usual printing equipment. If the molecular weight of the polybutenes or polyisobutenes is below about 800, the adhesion of the finished ink to the untreated polyethylene is unsatisfactory. The polybutenes and polyisobutenes are available on the commercial market under a variety of trademarks such as "Indopol H 1500" (Amoco Chemicals) and "Butyl 268" (Enjay Corporation).

The resins constituting the (b) ingredient of our ink base compositions can be selected from among numbers of materials which are readily available on the commercial market. Illustrative of such resins, which are normally solid, are polymers of beta-pinene (e.g. "Piccolyte S-135" and "Piccolyte S-85"—Pennsylvania Industrial Chemicals Co.); glycerol esters of hydrogenated rosins; terpene-phenolic resins; polymers formed by the polymerization of mixtures of monomers composed essentially of dienes and reactive olefins from cracking petroleum fractions (e.g. 'Piccopale" resins—Pennsylvania Industrial Chemicals Co.); and mixtures of any two or more thereof. They are generally solid at room temperatures and those which are particularly preferred have softening points in the range of about 100 to 150 degrees C.

The finely divided inert solids, which comprise the (c) ingredient of our ink base compositions, may be of inorganic or organic character and include by way of example, calcium carbonate, magnesium carbonate, calcium sulfate, magnesium sulfate, titanium dioxide, carbon black, diatomaceous earth, clays; and starches and flours such as corn starch and wheat flour. While the particular size of the inert solids is somewhat variable, for best results it should be sufficiently fine so as readily to pass a screen of about 300, better still about 325, mesh, with a good average in the range of 325 to 450 mesh. In terms of microns, the average particle size or the particle size in the main should, for best results, be less than about 1 micron. Such finely divided inert materials serve, among other purposes, favorably to affect viscosity, and to destroy the tack of the polybutenes and/or polyisobutene without, however, adversely affecting the adherence of the ink compositions to the untreated polyethylene.

The proportions of the (a), (b) and (c) ingredients are variable within certain limits. The proportions will vary, depending for instance, upon the particular polybutene and/or polyisobutene utilized. The optimum amount of finely divided inert solids in any given ink base formulation appears, in general, to be a function of its total surface area rather than its weight. Thus, by way of example, a comparatively small weight of diatomaceous earth in a given formulation will achieve substantially the same effect as a much greater weight of denser, and coarser, materials such as barium sulfate. In most cases, the finely divided inert solids will be present in amounts in excess of the amounts of either the polybutene (or polyisobutene) or the resin.

The ink compositions may be given any desired color by grinding pigments and/or dissolving organic dyes in the ink bases. Thus, for instance, white inks can be made with titanium dioxide, yellow inks with cadmium sulfide, blue inks with a phthalocyanine dye, and red inks with a toluidine toner. Where the color is conferred by an insoluble pigment, for instance, titanium dioxide, it will be appreciated that said pigment may serve to replace, in whole or in part, the aforementioned finely inert solids, to wit, the (c) ingredient.

Supplemental ingredients can be incorporated into the ink compositions of our invention so long as they are not of such character or are not used in such amounts as to affect adversely the desired fundamental properties and characteristics of our ink compositions. Thus, for instance, and solely by way of illustration and not by way of limitation, small amounts, of the general order of 1% to 8%, by weight of the finished ink compositions, of polyethylene wax can be added to increase gloss and abrasion resistance; or drying oils such as china wood oil or tung oil can be added, in proportions of the order of 3% to 8%, and driers such as cobalt octoate, lead naphthenate, cobalt naphthenate and mixtures thereof, in proportions of the order of 0.1% to 0.27% or even materially less, by weight of the finished ink compositions, can be added to improve gloss and abrasion resistance.

In the practical production of the ink base compositions of our invention, it is advantageous to maintain the base in fluid condition during its manufacture. Thus, for instance, the three aforementioned ingredients (a), (b) and (c) may be admixed with a solvent, say in proportions of the order of 80% solids and 20% solvent, said percentages being by weight. A suitable solvent is hexane, the ink base components being soluble therein and the hexane having a good drying rate. To the extent that the hexane might be objectionable if the rubber rollers encountered would be made of natural rubber, a part of the hexane can be replaced, for instance, with methyl ethyl ketone, a suitable organic solvent mixture comprising 60% hexane and 40% methyl ethyl ketone, said percentages being by weight. Other solvents, generally those which are more commonly used being of hydrocarbon character, can be employed.

The following examples are illustrative of ink bases and finished inks made in accordance with our invention. Others can readily be made in the light of the guiding principles and teachings disclosed herein. The examples, therefore, are not to be construed in any way as limitative of the full scope of the invention as different polybutenes and polyisobutenes, different resins, different finely divided inert solids, and different pigments and organic dyes and organic solvents, and different proportions can be selected without departing from the invention. All parts listed are by weight percent.

Example 1 (Ink base):
 Polybutene (average molecular weight 1200) -- 20
 CaCO₃ (325–350 mesh) ------------------------ 55
 B-pinene polymer (135 degrees C. softening point) --------------------------------- 25

Example 2 (Ink base):
 Polybutene (average molecular weight 9000) -- 20
 CaCO₃ (0.6 micron average particle size) ---- 70
 B-pinene polymer (110 degrees C. softening point) --------------------------------- 10

Example 3 (Ink base):
 Polyisobutene (average molecular weight 10,000 --------------------------------- 20
 Diatomaceous earth --------------------------- 50
 Diene-olefin polymer (softening point 110 degrees C.) ---------------------------------- 30

Example 4 (Ink):
 Polybutene (M.W. 1200) ("Indopol H 1500") --------------------------------- 15.4
 B-pinene polymer ("Piccolyte S–135") ------ 15.3
 Titanium dioxide ("Titanox RA"–Titanium Pigment Co.) ---------------------------------- 15.4
 CaCO₃ ("Camel-Tex") -------------------- 30.7
 Hexane --------------------------------- 12.8
 Methyl ethyl ketone -------------------- 10.4

Example 5 (Ink):
 Polybutene (M.W. 1200) ("Indopol H 1500") --------------------------------- 15.4
 B-pinene polymer ("Piccolyte S–135") ------ 15.3
 Titanium dioxide ("Titanox RA") --------- 7.7
 Chrome yellow ("Imperial X–1937"–Imperial Paper and Color Corp.) ------------------ 7.7
 CaCO₃ ("Camel-Tex") -------------------- 30.8
 Hexane --------------------------------- 12.8
 Methyl ethyl ketone -------------------- 10.3

Example 6 (Ink):
 Polyisobutene (M.W.>20,000) ("Butyl 268") -- 5
 Titanium dioxide ("Titanox RA") ---------- 20
 B-pinene polymer ("Piccolyte S–85") -------- 25
 Hexane --------------------------------- 50

In the manufacture of the inks of our invention, conventional types of mixing equipment can be used. Thus, for instance, the mixture of ingredients can be ball-milled for several hours to insure thorough and uniform dispersion of the insoluble constituents thereof.

In the attached drawing, the shaded areas in the triangular diagrams show typical ink base compositions which give particularly satisfactory results for printing on untreated polyethylene. In FIG. 1, a polybutene having an average molecular weight of about 1200 was used. In FIG. 2, a polybutene having an average molecular weight of about 9000 was used. In each case, the resin used was a polymerized beta-pinene having a softening point of 135 degrees C. The third ingredient was calcium carbonate an average particle size of 0.6 micron.

In place of the polymerized beta-pinene having a softening point of 135 degrees C. used in the ink base compositions shown in the attached drawings, equal weights of any of the following can be used with good results: polymerized beta-pinene having a softening point of about 85 degrees C.; glycerol ester of hydrogenated rosin having a softening point of 80 to 85 degrees C.; and a resin having a softening point of about 100 degrees C. made by polymerizing a mixture of monomers composed essentially of dienes and reactive olefins. Again, in place of the aforesaid resins, we may use, with very satisfactory effect, terpene-phenolic resins having softening points in the range of 100 to 150 degrees C., or partially polymerized rosin acids containing 6% calcium oxide. In general, these latter two types of resins can be used, with good results, in proportions of the order of 10% to 20% less than the amount of the polymerized beta-pinene resins.

The inks may be applied to the polyethylene by any conventional printing equipment and may be handled in the same general manner as in the case of conventional printing inks. It is generally desirable to heat the inked polyethylene surface to effect setting or drying of the ink. This is conveniently done at any suitable time, usually after the printing step, and it may be done in any conventional manner as, for instance, by radiant heaters or infrared lamp banks, a temperature of about 140 to 170 degrees F. for a short period of time being satisfactory.

What we claim as new and desire to protect by Letters Patent of the United States is:

1. In printing on solid olefin polymers to provide printing thereon which is strongly adherent thereto under normal conditions of use, the step which comprises effecting said printing with an ink composition consisting essentially of (a) a member selected from the group consisting of polybutenes and polyisobutenes having an average molecular weight in the range of 800 and about 80,000, (b) a normally solid resin having a softening point in the range of 100 to 150 degrees C., (c) a finely divided inert solid, (d) coloring matter which may at least in part be represented by said (c) ingredient, and (e) an ink-type organic solvent.

2. In printing on untreated polyethylene to provide printing thereon which is strongly adherent thereto under normal conditions of use, the step which comprises effecting said printing with an ink composition consisting essentially of (a) a member selected from the group consisting of polybutenes and polyisobutenes having an average molecular weight in the range of 1200 to 9000, (b) a normally solid resin having a softening point in the range of 100 to 150 degrees C., (c) a finely divided inert solid which passes through a 325 mesh screen, the said finely divided inert solid being present in proportions, by weight, in excess of each of the (a) and (b) ingredients, (d) coloring matter which may at least in part be represented by said (c) ingredient, and (e) an ink-type organic solvent.

3. In printing on untreated polyethylene to provide printing thereon which is strongly adherent thereto under normal conditions of use, the step which comprises effecting said printing with an ink composition consisting essentially of (a) a member selected from the group consisting of polybutenes and polyisobutenes having an average molecular weight in the range of 1200 to 9000, (b) a normally solid resin having a softening point in the range of 100 to 150 degrees C., (c) a finely divided inert solid which passes through a 325 mesh screen, said finely divided inert solid being selected from the group consisting of calcium carbonate, magnesium carbonate, calcium sulfate, magnesium sulfate, titanium dioxide, diatomaceous earth, and clays, the said finely divided inert solid being present in proportions, by weight, in excess of each of the (a) and (b) ingredients, (d) coloring matter, and (e) an ink-type organic solvent. .

4. In printing on untreated polyethylene to provide printing thereon which is strongly adherent thereto under normal conditions of use, the step which comprises effecting said printing with an ink consisting essentially, in admixture with coloring material and an ink-type organic solvent, of an ink base whose composition falls within the shaded area shown in FIG. 1 of the drawing.

5. In printing on untreated polyethylene to provide printing thereon which is strongly adherent thereto under normal conditions of use, the step which comprises effecting said printing with an ink consisting essentially, in admixture with coloring material and an ink-type organic solvent, of an ink base whose composition falls within the shaded area shown in FIG. 2 of the drawing.

References Cited by the Examiner

UNITED STATES PATENTS

| 2,320,717 | 6/1943 | Corkery et al. | 260—45.5 |
| 2,370,057 | 2/1945 | Mack | 260—45.5 |
| 2,453,644 | 11/1948 | Steinkraus | 260—45.5 XR |
| 2,484,060 | 10/1949 | Wing | 260—45.5 |
| 2,567,671 | 9/1951 | Joesting | 260—5 XR |
| 2,639,998 | 5/1953 | Pavlic | 117—38 |
| 2,715,388 | 8/1955 | Cofield et al. | 106—30 XR |

OTHER REFERENCES

Lane: "Australian Plastics" (1950) abstracted page 1702d, 1954, Chem. Abstracts, vol. 48.

Ellis: Printing Ink, Reinhold Pub. Co., 1940, page 409 relied. on.

MORRIS LIEBMAN, *Primary Examiner.*

JOHN R. SPECK, DANIEL ARNOLD, *Examiners.*